United States Patent
Cloud (10) Patent No.: US 9,606,251 B2
(45) Date of Patent: Mar. 28, 2017

(54) HYPERBOLIC SHOOTING METHOD AND DEVICE

(71) Applicant: CGG Services SA, Massy (FR)

(72) Inventor: Julien Cloud, Gentilly (FR)

(73) Assignee: CGG SERVICES SAS, Massy (FR)

( * ) Notice: Subject to any disclaimer, the term of this patent is extended or adjusted under 35 U.S.C. 154(b) by 875 days.

(21) Appl. No.: 13/962,171

(22) Filed: Aug. 8, 2013

(65) Prior Publication Data

US 2014/0043935 A1 Feb. 13, 2014

Related U.S. Application Data

(60) Provisional application No. 61/680,829, filed on Aug. 8, 2012.

(51) Int. Cl.
*G01V 1/00* (2006.01)
(52) U.S. Cl.
CPC .............. *G01V 1/003* (2013.01); *G01V 1/006* (2013.01)

(58) Field of Classification Search
CPC ...... G01V 1/364; G01V 2210/46; G01V 1/32; G01V 2210/244
See application file for complete search history.

(56) References Cited

U.S. PATENT DOCUMENTS

2013/0121110 A1* 5/2013 Trad ............... G01V 1/364
367/63

* cited by examiner

*Primary Examiner* — Luke Ratcliffe
(74) *Attorney, Agent, or Firm* — Patent Portfolio Builders PLLC (57) ABSTRACT

During a seismic survey, shots located close to one another are fired at a time interval shorter than an echo time interval and longer than a closest receiver time interval. During the echo time interval which follows a first shot, receivers located within a predetermined distance from the first shot location detect seismic reflections related to the first shot. During the closest-receiver time interval which follows the first shot, at least one seismic receiver located closest to the first shot location detects all the reflections from the first shot reaching this seismic receiver.

20 Claims, 6 Drawing Sheets

HYPERBOLIC SHOOTING METHOD AND DEVICE

CROSS REFERENCE TO RELATED APPLICATIONS

This application claims priority and benefit from U.S. Provisional Patent Application No. 61/680,829, filed Aug. 8, 2012, for "Hyperbolic Shooting," the entire content of which is incorporated in its entirety herein by reference.

BACKGROUND

Technical Field

Embodiments of the subject matter disclosed herein generally relate to methods and devices used for seismic surveys and, more particularly, to methods of firing seismic sources during such surveys.

Discussion of the Background

Due to continued interest in developing new oil and gas production, large financial, technical and human resources are used for seismic surveys capable of generating a profile (image) of underground geophysical structures. While this profile does not provide an accurate location for oil and gas, it suggests, to those trained in the field, the presence or absence of oil and/or gas.

In seismic surveys, a seismic source generates a seismic wave (an event known as a "shot"), which penetrates the underground structure and is reflected back by interfaces between layers through which the seismic wave propagates with different velocities. Seismic receivers detect the reflected waves that carry information about the underground structure (e.g., location of the reflecting interfaces).

Figure 1:
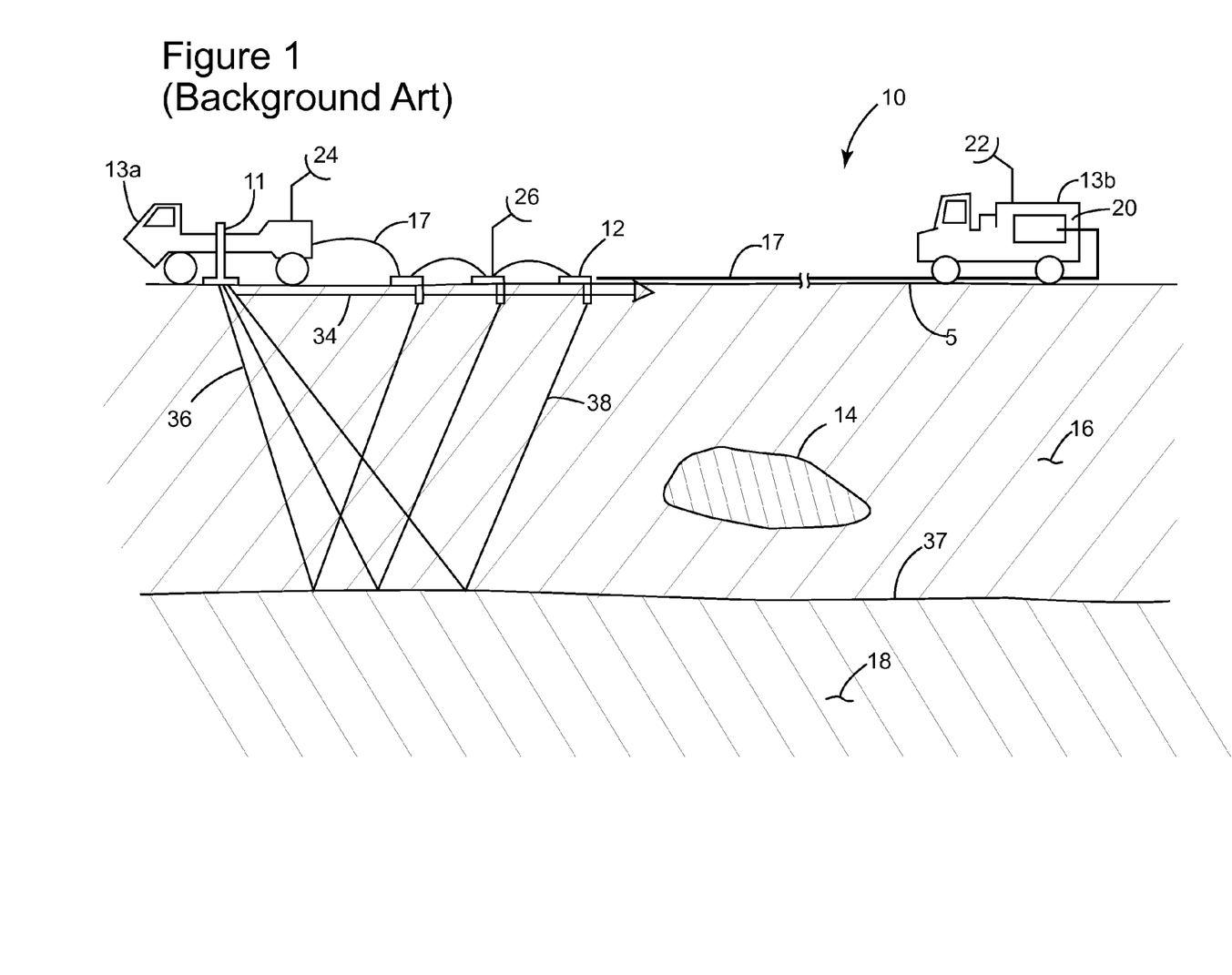
FIG. 1 is a generic illustration of a land seismic survey system.

FIG. 1 depicts schematically a land seismic exploration system 10 for transmitting and receiving seismic waves intended for seismic exploration in a land environment. At least one purpose of system 10 is to determine the absence, or presence of hydrocarbon deposits 14 or at least the probability of the absence or presence of hydrocarbon deposits 14. System 10 comprises a seismic source 11 (e.g., a vibrator) operable to generate a seismic signal (seismic waves), a plurality of seismic receivers 12 (or geophones) for receiving seismic signals and converting them into electrical signals, and seismic data acquisition system 20 for recording the electrical signals generated by seismic receivers 12. Seismic source 11 and seismic data acquisition 20 can be located in, for example, vehicles/trucks 13a and 13b, respectively. Source 11, seismic receivers 12, and data acquisition system 20, can be positioned on the surface of ground 15, and be interconnected by one or more cables 17. Source 11, seismic receivers 12, and data acquisition system 20 may also communicate wirelessly using antenna 22, 24, and 26, respectively.

A seismic wave generated by source 11 may include surface waves 34, and ground waves 36. The ground waves 36 may generate reflected waves 38 when they reach an interface 37 between two geological layers, the hydrocarbon deposits 14 or other underground reflecting structures such as 16 or 18. Each seismic detector 12 receives both surface waves 34 and reflected waves 38 and outputs an electrical signal accordingly.

Conventionally, a new shot is not fired while the seismic receivers still detect reflections from a previous shot. In order to shorten the duration of seismic data acquisition, a series of methods decreasing time necessary to fire all the shots has lately been developed and tested. For example, shots are fired simultaneously but physically far apart, or have different phases, or only waves that have different frequency ranges overlap in time (a method known as slip-sweep).

Due to the high cost of seismic surveys, there is a continuous desire to improve productivity (e.g., decrease their duration) and data quality. Accordingly, it would be desirable to provide systems and methods to speed up seismic surveys without compromising seismic data quality.

SUMMARY

Taking advantage of the curvature of a given record horizon at the end of a recording window, methods and devices according to various embodiments fire closely-located shots at a time interval shorter than an echo time interval, but longer than a closest-receiver time interval.

According to one exemplary embodiment, there is a method for firing seismic sources including (A) firing a first shot at a first location at a first time, and (B) firing a second shot at a second location close to the first location, at a second time, with the time interval between the first and second times shorter than an echo time interval, but longer than a closest-receiver time interval. During the echo time interval, seismic receivers located within a predetermined distance from the first location detect reflections from the first shot. During the closest-receiver time interval, at least one seismic receiver located closest to the first location detects all the reflections from the first shot reaching this seismic receiver. The seismic receivers other than the at least one seismic receiver detect overlapping reflections due to both the first and second shots.

According to another exemplary embodiment, there is a seismic survey system including seismic sources configured to fire shots that generate seismic waves propagating in an investigated underground structure, with seismic receivers configured to detect reflections of the seismic waves, and a controller. The controller is configured to trigger the seismic sources to fire a first shot at a first location, at a first time, and then a second shot at a second location close to the first location, at a second time, with the time interval between the first and second times shorter than an echo time interval, but longer than a closest-receiver time interval. During the echo time interval, seismic receivers located within a predetermined distance from the first location detect reflections from the first shot. During the closest-receiver time interval, at least one seismic receiver located closest to the first location detects all the first reflections from the first shot reaching that seismic receiver.

According to another exemplary embodiment, there is a controller in communication with seismic sources that has an interface configured to send firing signals to the seismic sources, and a processing unit. The processing unit is configured to generate a first firing signal and to control the interface to send the first firing signal to the seismic sources so as to cause a first shot at a first location, at a first time. The processing unit is further configured to generate a second firing signal and to control the interface to send the second firing signal to the seismic sources so as to cause a second shot to be fired close to the first location at a second time. The time interval between the first and second times is shorter than an echo time interval, but longer than a closest-receiver time interval. During the echo time interval, seismic receivers located within a predetermined distance from the first location detect reflections from the first shot. During the closest-receiver time interval, at least one seismic receiver located closest to the first location detects all the reflections from the first shot reaching this seismic receiver.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic survey system. However, the present inventive concept is not limited to land survey systems, but may be used also for marine seismic surveys using ocean bottom seismic detectors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
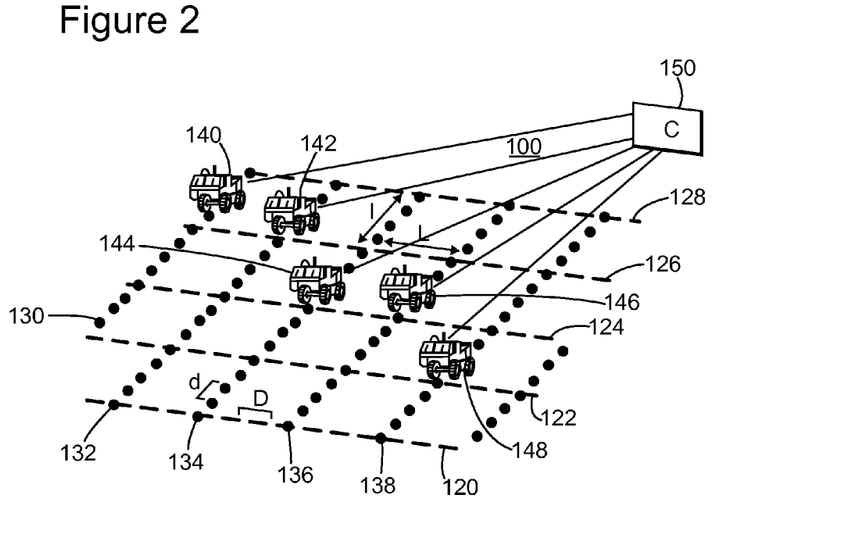
FIG. 2 is a schematic diagram of a land seismic survey system according to an exemplary embodiment.

An exemplary land seismic survey system 100 is illustrated in FIG. 2. Parallel receiver lines 120, 122, 124, 126 and 128 on an ideal flat surface are intersected by shot lines 130, 132, 134, 136 and 138 perpendicular to the receiver lines. The "parallel" and "perpendicular" characteristics should be considered an exemplary illustration and not a limitation.

The receiver lines are preferably arranged at regular distances (/) of 100-250 m. Seismic receivers are located at predetermined and preferably regular distances (D), for example, in the range of 7.5 to 50 m, along the receiver lines.

Plural seismic sources such as 140, 142, 144, 146 and 148 generating seismic waves (shots) may be mounted on trucks. Shots are fired at predetermined locations along the shot lines. Distances between adjacent shot locations (d) may be tens of meters. Distances between the shot lines (L) may also be tens or a few hundred meters. Trucks carrying land seismic sources may be guided to shot locations using GPS signals. A controller 150 in remote communication with the seismic sources may control the moment when the shots are fired.

Figure 3:
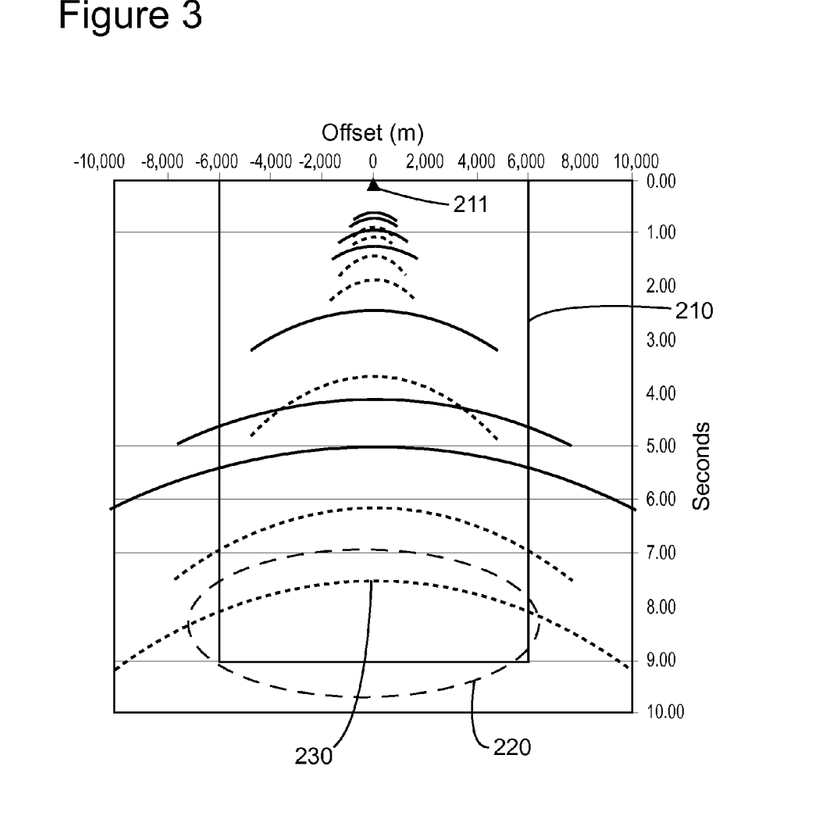
FIG. 3 is a graph illustrating data related to a shot.

Reflections following a shot are detected a few seconds (e.g., until 10 s after the shot) by seismic receivers located up to thousands of meters from the shot location. FIG. 3 is a graph illustrating a typical record following a shot 211. The x-axis of the graph represents the offset of the seismic receiver, which corresponds to the distance from the seismic receiver to the shot location. The y-axis represents the time after the shot until a reflected wave signal reaches a respective seismic receiver.

Seismic waves generated by seismic sources are usually P-waves, which are longitudinal, compressional waves. An incident P-wave reflected at a solid-solid interface may yield both a reflected P-wave and a reflected S-wave (i.e., shear, transverse wave). It is well known that reflected P-waves travel faster than reflected S-waves (the "P" standing for "primary" and the "S" for "secondary," indicating the order in which these waves reach the seismic receivers). Thus, for any pair of waves reflected by the same interface, reflected P-waves reach seismic receivers faster than reflected S-waves. In the graph in FIG. 3, reflected P-waves are illustrated using continuous lines, and reflected S-waves are illustrated using dashed lines. Since P-waves arrive at the seismic detectors earlier than S-waves, the last reflected wave 230 (also known as a "horizon") in a record related to a shot is an S-wave.

Reflected S- and P-waves carry complementary information relative to the underground structure. Generating an S-wave-based image in addition to the P-wave-based image gives access to an additional rock parameter (e.g., Poisson's ratio or simply the velocity ratio Vp/Vs). This additional parameter enables better discrimination of layers than a P-wave-based image alone (e.g., allows evaluating porosity of layers and identifying pore-saturated layers). The seismic receivers are configured to be able to detect both reflected S- and P-waves. For example, a receiver may include a hydrophone and a 3C geophone, or a 3D accelerometer.

Data related to reflected waves detected by seismic receivers located within a predetermined distance from the shot location is recorded (i.e., receiver offsets are within a predetermined range). In FIG. 3, recorded data related to a shot is the data inside rectangle 210. The length of rectangle 210 along axis x is defined by the predetermined distance. The number of seismic receivers within the predetermined distance may be larger than 4,000.

The length of the rectangle 210 along axis y (also known as record length) corresponds to an echo time interval during which seismic receivers located within the predetermined distance from the shot location detect reflections from the shot. Record length is limited by the energy of the incident wave, the adsorption and dispersion of waves in the substrate, and the seismic receivers' sensitivity.

Due to the directionality of the incident wave (which propagates within a cone having a predetermined angular span and its tip at the shot location), the closer to the surface a layer interface is located, the fewer seismic receivers (i.e., the ones closer to the shot location) detect reflected waves.

Within this recording window 210, reflections from the same interface have a curved profile, such as line 230 highlighted by the presence of the oval shape 220. This curvature is due to delays caused by the longer paths traveled by the incident wave and the reflected wave to reach the seismic receivers farther from the source location. Also, the deeper a reflecting interface is, the larger the curvature of waves reflected from the interface, while the reflected waves reach a larger number of and more distant seismic receivers.

Figure 4:
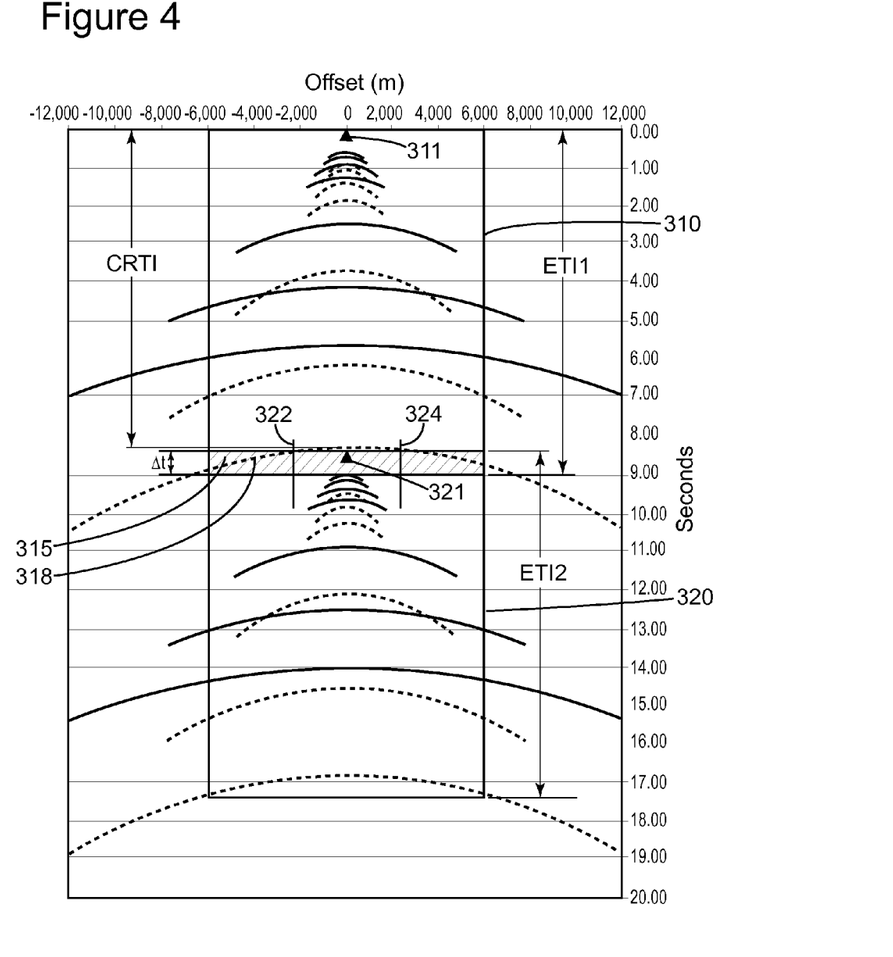
FIG. 4 is a graph illustrating data related to consecutive shots fired in a manner according to an exemplary embodiment.

FIG. 4 is a graph similar to the graph in FIG. 3, illustrating wave reflections detected by seismic receivers following two shots: a first shot fired at a first location 311 at a first time, and a second shot fired at a second location 321 at a second time. Data corresponding to reflections from the first shot is represented inside rectangle 310. Data corresponding to reflections from the second shot is represented inside rectangle 320. Rectangles 310 and 320 overlap, having a common portion 315.

The second location 321 being close to the first location 311 means that substantially the same seismic receivers detect both the first and second shots (there is no visible horizontal shift of rectangle 320 relative to rectangle 310). For example, the second location may be adjacent to the first location on a shot line. Since the distance between the first and second locations (if the locations do not coincide) is tens of meters, while the predetermined distance (e.g., 6,000 m, the span of the rectangles left and right to "0" on the x-axis) is thousands of meters, it is evident that substantially the same seismic receivers detect both the first shot and the second shot.

The length of rectangles 310 and 320 corresponds to the echo time intervals, ETI1 and ETI2, respectively, (which are the same, assuming that the seismic sources firing the shots are similar). The closest-receiver time interval, CRTI, starts when the shot is fired, and ends when a seismic detector located closest to the shot location detects the last S-wave from the first shot.

A difference ($\Delta t$) between the echo time interval and the closest-receiver time interval may depend on the recording duration, target depth, wave propagation velocities and the predetermined distance defining the receivers' offset range (i.e., width of the recording window). The difference $\Delta t$ may be between 0.5 s and 0.6 s for an echo time of about 9 s. In the overlapping portion 315 (that has the length along y-axis $\Delta t$), data related to the last S-wave reflection 318 from the first shot is blended with data related to S- and P-wave reflections from the second shot detected by seismic receivers located close to the shot locations (i.e., within a minimum distance around the shot locations as suggested by lines 322 and 324).

Data quality is not affected by this blending of the data, because the data related to the last S-wave reflection 318 from the first shot can be separated from the data related to reflections from the second shot. For example, timing of the last S-wave 318 as detected by receivers close to the shot location may be predicted from data related to the last S-wave 318 receivers distant from the shot location and/or from the P-wave reflection from the same underground solid-solid interface. The de-blending of data may be achieved before any further seismic data processing is undertaken.

The gain in time obtained by firing shots at time intervals shorter than the echo time interval may be converted in higher density of shot locations. Thus, in one embodiment, a distance between shots (e.g., between the first and second shot locations) may be shorter than a conventional distance between shot locations used when a conventional time interval between shots is equal to or larger than the echo time interval.

Figure 5:
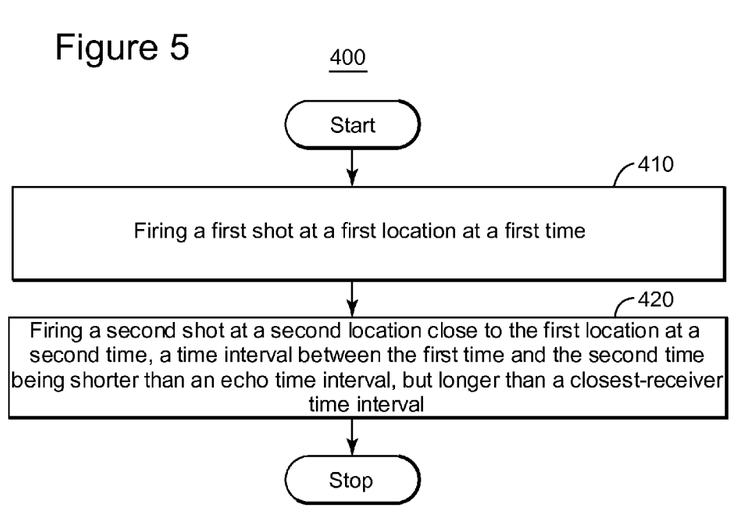
FIG. 5 is a flowchart illustrating steps performed by a method for firing land seismic sources according to an exemplary embodiment.

According to an exemplary embodiment, a method 400 for firing land seismic sources uses a shorter interval between shots than the echo time. FIG. 5 is a flowchart illustrating steps performed by method 400. Method 400 includes firing a first shot at a first location at a first time, at 410. Method 400 further includes firing a second shot at a second location close to the first location, at a second time, at 420. The second time is such that the time interval between the first and second times is shorter than the echo time interval following the first shot (ETI1), but longer than a closest-receiver time interval (CRTI). During ETI1, seismic receivers located within a predetermined distance from the first location detect reflections from the first shot. During CRTI, a seismic receiver located closest to the first location detects all reflections from the first shot reaching this seismic receiver.

Returning now to FIG. 2, the controller 150 may be configured to trigger seismic sources to fire shots. After a first shot is fired at a first location at a first time, the controller 150 may control a nearby seismic source to fire a second shot at a second location close to the first location, at a second time. The time interval between the first and second times is shorter than the echo time interval (ETI1 in FIG. 4), but longer than the closest-receiver time interval (CRTI in FIG. 4). The controller 150 may be configured to select (e.g., adjust) the second time in the time window between the echo time interval and the closest-receiver time interval, depending on one or more of a recording duration, target depth, wave propagation velocities and the predetermined distance defining the receivers' offset range. The echo time interval may be about 0.6 s longer than the closest-receiver time interval.

Figure 6:
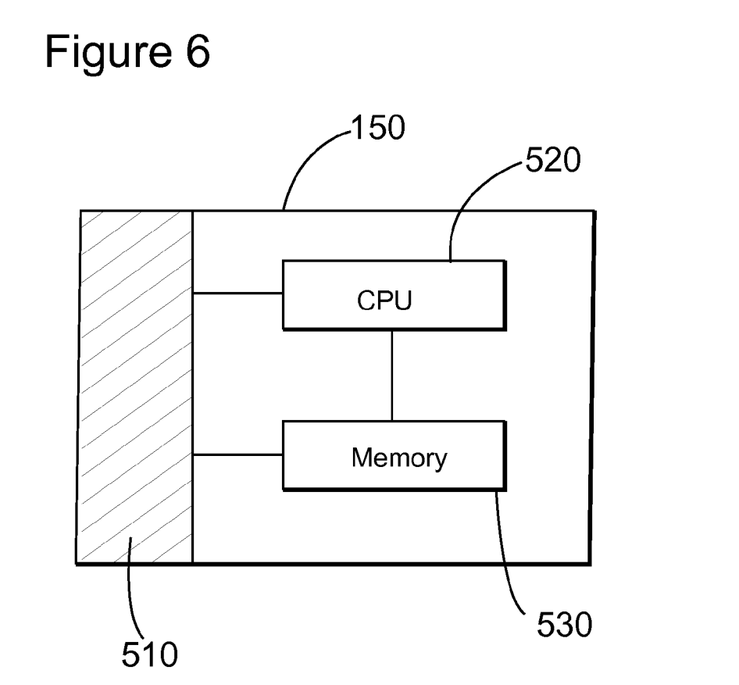
FIG. 6 is a schematic diagram of a controller according to an exemplary embodiment.

A schematic diagram of controller 150 is illustrated in FIG. 6. The controller has an interface 510 configured to send firing signals to the land seismic sources, and a processing unit 520. The controller 150 may also include data storage unit 530 configured to store information and software usable by the data processing unit.

Processing unit 520 is configured to generate a first firing signal and to control interface 510 to send the first firing signal to the land seismic sources so as to cause a first shot at a first location at a first time. Processing unit 520 is further configured to generate a second firing signal and to control interface 510 to send the second firing signal to the land seismic sources so as to cause a second shot close to the first location at a second time. The time interval between the first and second times is shorter than the echo time interval, but longer than the closest-receiver time interval.

Processing unit 520 may also be configured to determine the second time between an end of the closest-receiver time interval and an end of the echo time interval, depending on one or more of a recording duration, target depth, wave propagation velocities and the predetermined distance defining the receivers' offset range. For example, the processing unit may determine the second time such that a difference between the second time and an end of the echo time interval may be up to 0.5 s when the echo time interval is about 0.6 s longer than the closest-receiver time interval.

The disclosed exemplary embodiments provide a method, a land seismic survey system and a controller configured to fire seismic sources at a time interval shorter than the echo time interval and longer than the closest-receiver time interval. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for firing seismic sources, the method comprising:
    firing a first shot at a first location at a first time;
    firing a second shot at a second location close to the first location at a second time, a time interval between the first time and the second time being shorter than an echo time interval (ETI), but longer than a closest-receiver time (CRTI) interval,
    wherein
        during the echo time interval, seismic receivers located within a predetermined distance from the first location detect reflections from the first shot,
        during the closest-receiver time interval, (1) at least one seismic receiver located closest to the first location detects all reflections from the first shot reaching said seismic receiver, and (2) seismic receivers other than the at least one seismic receiver detect overlapping reflections due to both the first shot and the second shot;
    recording blended seismic data with the seismic receivers other than the at least one seismic receiver; and
    recording unblended seismic data with the at least one seismic receiver located closest to the first location.

2. The method of claim 1, wherein a difference between the echo time interval and the closest-receiver time interval depends on one or more of a recording duration, target depth, wave propagation velocities and the predetermined distance.

3. The method of claim 1, wherein the echo time interval is about 0.5 s longer than the closest-receiver time interval.

4. The method of claim 1, wherein the seismic receivers are configured to detect both P-wave reflections and S-wave reflections.

5. The method of claim 1, wherein the second location is adjacent to the first location on a shot line.

6. The method of claim 5, wherein a distance between the first shot location and the second shot location is shorter than a conventional distance between shot locations used when a conventional time interval between shots is equal to or larger than the echo time interval.

7. The method of claim 1, wherein, in data recorded from the seismic detectors, first data related to last S-wave reflection due to the first shot detected by a first subset of the seismic receivers located father than a minimum distance from the first location, and second data related to S-wave and P-wave reflections due to the second shot detected by a second subset of seismic receivers located within the minimum distance are blended.

8. The method of claim 1, wherein at least one of the following conditions are met:
    a distance between the first location and the second location is less than or equal to 50 m,
    the seismic receivers are arranged on receiver lines having a distance there-between of no more than 250 m, and
    a number of the seismic receivers within the predetermined distance is larger than 4000.

9. A seismic survey system, comprising:
    seismic sources configured to fire shots thereby generating seismic waves propagating in an investigated underground structure;
    seismic receivers configured to detect reflections of the seismic waves; and
    a controller configured to trigger the seismic sources to fire a first shot at a first location, at a first time, and then a second shot at a second location close to the first location, at a second time, a time interval between the first time and the second time being shorter than an echo time interval, but longer than a closest-receiver time interval,
    wherein
        during the echo time interval, seismic receivers located within a predetermined distance from the first location detect the reflections from the first shot,
        during the closest-receiver time interval, (1) at least one seismic receiver located closest to the first location detects all the reflections from the first shot reaching said at least one seismic receiver and (2) seismic receivers other than the at least one seismic receiver detect overlapping reflections due to both the first shot and the second shot,
        the seismic receivers other than the at least one seismic receiver record blended seismic data, and
        the at least one seismic receiver located closest to the first location records unblended seismic data.

10. The seismic survey system of claim 9, wherein the controller is configured to select a difference between the echo time interval and the closest-receiver time interval depending on one or more of a recording duration, target depth, wave propagation velocities and the predetermined distance.

11. The seismic survey system of claim 9, wherein the echo time interval is about 0.5 s shorter than the closest-receiver time interval.

12. The seismic survey system of claim 9, wherein the seismic receivers are configured to detect both P-wave reflections and S-wave reflections.

13. The seismic survey system of claim 9, wherein the second location is adjacent to the first location on a shot line.

14. The seismic survey system of claim 9, wherein a distance between the first shot location and the second shot location is shorter than a conventional distance between shot locations used when a conventional time interval between shots is equal to or larger than the echo time interval.

15. The seismic survey system of claim 9, wherein, in data recorded from the subset of the seismic receivers, (A) first data related to last S-wave reflection due to the first shot detected by a first group including the seismic receivers of the subset located father than a minimum distance from the first location, and (B) second data related to S-wave and P-wave reflections due to the second shot detected by a second group including the seismic receivers of the subset located within the minimum distance are blended.

16. The seismic survey system of claim 9, wherein at least one of the following conditions are met:
    a distance between the first location and the second location is less than or equal to 50 m,
    the seismic receivers are arranged on receiver lines having a distance there-between of no more than 250 m, and a number of the seismic receivers within the predetermined distance is larger than 4000.

17. A controller in communication with seismic sources, the controller comprising:
an interface configured to send firing signals to the seismic sources; and
a processing unit configured
to generate a first firing signal and to control the interface to send the first firing signal to the seismic sources so as to cause a first shot at a first location, at a first time, and
to generate a second firing signal and to control the interface to send the second firing signal to the seismic sources so as to cause a second shot close to the first location at a second time, a time interval between the first time and the second time being shorter than an echo time interval, but longer than a closest-receiver time interval
wherein
during the echo time interval, seismic receivers located within a predetermined distance from the first location detecting reflections from the first shot, and
during the closest-receiver time interval, (1) at least one seismic receiver located closest to the first location detects all the reflections from the first shot reaching said at least one seismic receiver, and (2) seismic receivers other than the at least one seismic receiver detect overlapping reflections due to both the first shot and the second shot,
the seismic receivers other than the at least one seismic receiver record blended seismic data, and
the at least one seismic receiver located closest to the first location records unblended seismic data.

18. The controller of claim 17, wherein the processing unit is configured to determine the time interval such that a difference between the echo time interval and the closest-receiver time interval depends on one or more of a recording duration, target depth, wave propagation velocities and the predetermined distance.

19. The controller of claim 17, wherein the processing unit is configured to determine the time interval in view of a difference between the echo time interval and the closest-receiver time interval of about 0.5 s.

20. The controller of claim 17, wherein in data recorded from the seismic detectors, first data related to last S-wave reflection due to the first shot detected by a first subset of the seismic receivers located father than a minimum distance from the first location, and second data related to S-wave and P-wave reflections due to the second shot detected by a second subset of seismic receivers located within the minimum distance are blended.

* * * * *